(12) United States Patent
Kinzelmann

(10) Patent No.: US 11,712,880 B2
(45) Date of Patent: Aug. 1, 2023

(54) PROCESS FOR BONDING FLEXIBLE FILMS AND DEVICE FOR CARRYING OUT THE SAME

(71) Applicant: Henkel AG & Co. KGaA, Duesseldorf (DE)

(72) Inventor: Hans-Georg Kinzelmann, Pulheim (DE)

(73) Assignee: Henkel AG & Co. KGaA, Duesseldorf (DE)

(*) Notice: Subject to any disclaimer, the term of this patent is extended or adjusted under 35 U.S.C. 154(b) by 0 days.

(21) Appl. No.: 17/453,062

(22) Filed: Nov. 1, 2021

(65) Prior Publication Data

US 2022/0105718 A1 Apr. 7, 2022

Related U.S. Application Data

(63) Continuation of application No. PCT/EP2020/058459, filed on Mar. 26, 2020.

(30) Foreign Application Priority Data

May 2, 2019 (EP) .................................... 19172264

(51) Int. Cl.
*B32B 37/06* (2006.01)
*B32B 37/00* (2006.01)
*B32B 37/10* (2006.01)
*B32B 37/12* (2006.01)

(52) U.S. Cl.
CPC .......... *B32B 37/06* (2013.01); *B32B 37/0053* (2013.01); *B32B 37/10* (2013.01); *B32B 37/1284* (2013.01); *B32B 2398/20* (2013.01)

(58) Field of Classification Search
CPC . B29C 66/0242; B32B 37/0053; B32B 37/06; B32B 37/10; B32B 37/1284; B32B 37/0007; B32B 37/04; B32B 2398/20; B32B 38/004
USPC ......................................................... 156/322
See application file for complete search history.

(56) References Cited

U.S. PATENT DOCUMENTS

| | | | | |
|---|---|---|---|---|
| 1,400,043 | A * | 12/1921 | Frederick | B31C 1/00 219/244 |
| 3,208,898 | A * | 9/1965 | Chavannes | B29C 66/0242 101/23 |
| 5,250,610 | A | 10/1993 | Haensel et al. | |
| 6,599,387 | B1 | 7/2003 | Theil et al. | |
| 2011/0086237 | A1 | 4/2011 | Chambers et al. | |

(Continued)

FOREIGN PATENT DOCUMENTS

| | | |
|---|---|---|
| DE | 102005028661 A1 | 12/2006 |
| WO | 9703821 A1 | 2/1997 |

OTHER PUBLICATIONS

Bob Pasquale: Lamination System Application and Design Considerations, Oct. 8, 2018.

(Continued)

*Primary Examiner* — John L Goff, II
(74) *Attorney, Agent, or Firm* — James E. Piotrowski

(57) ABSTRACT

The present invention refers to a process for bonding flexible films by converting the surface of a first film into a softened state before contacting the softened surface with a second film, a device for carrying out the inventive process as well as a composite body obtained by the inventive process or by the inventive device.

10 Claims, 2 Drawing Sheets

(56) References Cited

U.S. PATENT DOCUMENTS

2015/0140307 A1   5/2015   Kinzelmann et al.
2017/0203543 A1   7/2017   Kinzelmann et al.

OTHER PUBLICATIONS

International Search Report for International PCT Patent Application No. PCT/EP2020/058459 dated May 13, 2020.

* cited by examiner

US 11,712,880 B2

PROCESS FOR BONDING FLEXIBLE FILMS AND DEVICE FOR CARRYING OUT THE SAME

FIELD

The present invention refers to a process for bonding flexible films by converting the surface of a first film into a softened state before contacting the softened surface with a second film, a device for carrying out the inventive process as well as a composite body obtained by the inventive process or by the inventive device.

BRIEF DESCRIPTION

Methods for bonding flexible films are known to the person skilled in the art, covering a wide variety of different embodiments and adhesives. In most cases, bonding the films to one another requires a substantial amount of adhesive to ensure that the films are completely bonded and delamination is avoided. However, in light of the ongoing discussion of sustainability and conserving natural resources, attempts have been made to reduce the amount of adhesive needed in laminating flexible films.

U.S. Pat. No. 5,250,610 discloses a composite which is produced by a process which includes applying an aqueous polyurethane dispersion based on a high molecular weight polyhydroxyl component containing carboxylic acid groups and an organic polyisocyanate to the surface of a material or workpiece and contacting said surface with the surface of another material or workpiece. By using the special aqueous polyurethane dispersion, the amount of adhesive can be reduced to 1.5 g/m².

WO 97/03821 describes a process for preparing a laminate wherein a fluid adhesive, the curing of which is accelerated by a catalyst, is applied to a first solid film, whereupon a secondary solid or fluid film, consisting totally or partially of plastic material, is contacted herewith, the latter film containing the catalyst for accelerating the curing of the adhesive. The amount of adhesive applied is 1.5 g/m².

However, by reducing the amount of adhesive, apart from risking delamination, the risk that air bubbles are trapped during the process increases. Such trapped air bubbles can be visually perceptible in the resulting composite body, especially in cases where transparent films are used, thereby negatively affecting the optical and mechanical performance of the obtained product. Further, in most cases the adhesive not only acts as a bond between the substrates but also compensates any irregularities in the surfaces of the substrates to be bonded. If the amount of adhesive is reduced, it is therefore necessary to find alternative ways of smoothing the surfaces of the substrates before bonding. One way to smooth the surface of a given substrate is to heat said surface in order to smooth out any irregularities.

US 2015/0140307 discloses a method for adhesively bonding two substrates, the method comprising applying an adhesive onto a first substrate, bringing the first substrate with the applied adhesive together with a second substrate made of a thermoplastic and converting the surface of the second substrate into a softened state by heating, wherein the substrates are adhesively bonded to one another before, during and/or immediately after heating by means of pressure. The adhesive is applied in a coating weight of 2 g/m² or less.

The article "Lamination system application and design considerations" by Bob Pasquale provides a summary of several different methods for laminating multiple webs, including thermal bond lamination where two or more webs are combined using heat and pressure. In this case, a primary web pre-heated about a main heat roll and a secondary web, which may be pre-heated prior to lamination, is introduced to the primary web at the nip point. The article stresses the importance of the pre-heating of any web being performed as close to the lamination point as possible as well as the importance of cooling the product as soon after lamination/exiting of the main heat roll as possible.

DE 10 2005 028 661 refers to a process for the production of a two-layer film wherein two thermoplastic films having a different thickness are lead past a source of thermal irradiation in a way that the two films are softened or melted before being brought together, wherein the softening or melting is achieved by way of infrared irradiators.

US 2011/0086237 discloses a bonding apparatus for bonding a thermoplastic first material to a second material, the apparatus including a heater arrangement for heating a bonding surface of the first material to melt the bonding surface, and moving means for moving the first and second materials together to a bonded condition.

However, although the surface is smoothed, heating is usually accompanied by deformation of the heated substrate, in particular stretching, so that the resulting composite body is twisted and distorted.

U.S. Pat. No. 6,599,387 concerns a method for the production of a flat composite from plastic parts by means of a thermal adhesion of the two plastic parts, heated on one side for their surfaces, wherein the surfaces are heated on the adhesion side to a surface temperature of 10 to 100 K above the Vicat softening points, provided that the plastic parts retain their original shape during the preheating phase, and are pressed between a pair of rolls at an advance rate between 5 and 200 mm/sec and with a pressing force between 10 and 500 N acting on the roll. The surfaces of the adhesion side of the plastic parts are heated either by indirect physical methods such as high-frequency electromagnetic fields or ultrasonic fields, or by direct methods for heat irradiation such as warm air blower or infrared irradiators. Preferably, the plastic parts are preheated in an oven to avoid thermal stresses.

US 2017/0203543 addresses the above problem by providing a method for adhesively bonding two substrates, the method comprising (i) transporting a first film-shaped substrate containing at least one thermoplastic on at least one supporting conveyer belt through a heating zone in which the substrate is heated so that the surface of the first substrate is transformed into a softened state; (ii) bringing the first substrate together with a second substrate, wherein the surface of the second substrate has been coated with an adhesive at a coating weight of 0.01 to 4 g/m², during and/or immediately after the heating; and (iii) adhesively bonding the two substrates by pressure.

The process described in the prior art employing a supporting conveyer belt in order to minimize deformation of the heated substrate film still suffers from the drawback that special care has to be taken with regard to the speed with which the conveyer belt is operated. Further, although deformation in a longitudinal direction may be reduced, the problem of deformation in a transversal direction has not been addressed.

DETAILED DESCRIPTION

Figure 1:
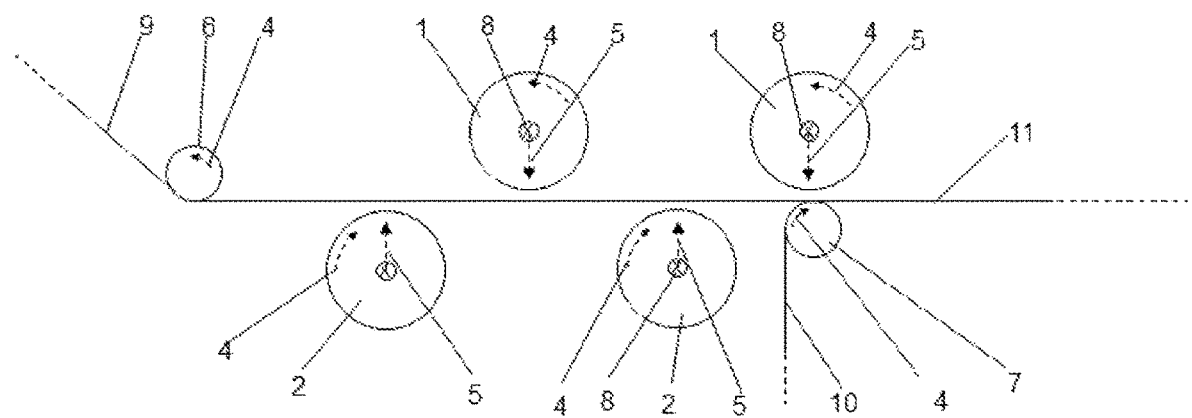
FIG. 1 shows an embodiment of the present invention wherein a set of rollers is adjustable in a linear way and is arranged in either side of the first film. The embodiment of FIG. 1 is in an idle state.

It is therefore the object of the present invention to provide a process which allows lamination of flexible film without risking deformation of the films during lamination.

It was surprisingly found that the above object is solved by a process wherein the heating of the film is effected by an assembly of heatable rollers.

A first object of the present invention is therefore a process for bonding flexible films, the process comprising:
  i) providing a first film having a thermoplastic surface;
  ii) providing a second film;
  iii) bringing the first film and the second film together by means of pressure;
wherein the thermoplastic surface of the first film is converted into a softened state by means of heating before being brought together with the second film;
characterized in that heating of the surface of the first film is effected by an assembly of heatable rollers (1, 2).

Softened state according to the invention refers to a state of the substrate in which the surface of the substrate may be plastically deformed while the substrate remains dimensionally stable without losing its original shape.

In a preferred embodiment, the surface of the second film is coated with an adhesive.

By effecting the heating of the surface of the film by means of an assembly of heatable rollers, complicated heating by means of radiators or hot air is avoided. Further, it was surprisingly found that heating efficiency is much more enhanced by directly contacting the thermoplastic surface of the film with a heating roller. In addition, an additional smoothing of the surface was observed, believed to be caused by the direct contact of the thermoplastic film with the surface of the roller. Also, by including the means for heating the surface into the transportation system of the film, the speed with which the film is transported could be increased without risk of longitudinal and transversal deformation of the film.

In a preferred embodiment, the assembly of heatable rollers, includes 2 to 10, especially 2 to 5, heatable rollers which are preferably arranged in horizontal succession relative to the process direction. The thermoplastic surface of the first film is converted into a softened state by means of the heating device. However, care should be taken that the surface is not overheated in order to avoid damage to the film. In this regard, it is desirable to control the input of energy during heating without interrupting the process. It was surprisingly found that the energy input may be controlled by adjusting the distance between the heatable rollers and the first film. In a preferred embodiment, each of the heatable rollers of the assembly is therefore individually controllable, allowing to adjust the distance of the heatable rollers and the first film by, for example, removing one or more of the heatable rollers from contact with the first film. It was surprisingly found that this procedure allows for individual and easy adjustment during heating of the thermoplastic surface. The temperature of the heatable rollers of the assembly may be adjusted in accordance with the softening point of the thermoplastic surface of the first film.

The softening point of any given thermoplastic material may be determined according to a number of methods, for example by heat deflection (ASTM D648) or according to the method of ring & ball (ISO 4625). The softening temperature of commonly used thermoplastics is summarized in pertinent tables. In a preferred embodiment, the at least one heatable roller has a temperature of 80 to 300° C., preferably 110 to 200° C. Preferably, the temperature of each heatable roller may be controlled individually. This way, the temperatures of the heatable rollers may differ from each other. Therefore, in a preferred embodiment, each of the heatable rollers has the same or a different temperature.

Further, the diameter heatable rollers of the assembly may be chosen according to need. In a preferred embodiment, the at least one heatable roller has a diameter of 10 to 250 cm, preferably 50 to 100 cm.

In the course of the present invention, it was surprisingly found that deformation of the heated film can be avoided without the need for cooling. Rather, the temperature of the film can be controlled by individually adjusting the temperature of each heatable roller, resulting in an improved balance of energy. Further, by adjusting the speed of the heatable rollers individually, additional means of control are provided. In a preferred embodiment, each of the heatable rollers is therefore actively driven. Further preferred is an embodiment wherein each of the heatable rollers is actively driven and addressed individually.

In a preferred embodiment of the inventive process, the first film is led through a series of rollers which are arranged on both sides of the film wherein each roller is individually adjustable in order to bring the surface of the roller into contact with the film. Preferably, the set of rollers is operated in a way that neighboring rollers have opposite direction of rotation. At least the rollers facing the thermoplastic surface of the first film are heatable rollers to transfer the thermoplastic surface of the film into a softened state. It was found that by individually adjusting the rollers, the contact area between the rollers and the film may be adapted according to need, allowing a precise adjustment of the energy input of the thermoplastic surface. The rollers are preferably adjustable in a linear and/or non-linear way.

The inventive process is especially designed for bonding flexible films which may, for example be used in the production of food packaging. In a preferred embodiment, the first film comprises or is made of a material selected from polyolefins such as polyethylene and polypropylene, polyvinyl chloride, ethylene copolymers such as ethylene-vinyl-acetate, ethylene-acrylate copolymers, ethylene-methyl methacrylate copolymer and ethylene-acrylic acid copolymer, polyesters, polylactides, polyamides and ionomers. In an especially preferred embodiment, the first film comprises or is made of polyethylene, polypropylene or mixtures thereof.

In a preferred embodiment, the second film comprises or is made of a material selected from metals such as aluminum, iron, and zinc, metal alloys such as bronze and aluminum alloys, thermosetting or thermoplastic plastics such as polyethylene, polypropylene, polyvinyl chloride, polystyrene, acrylonitrile-butadiene-styrene copolymers, polyesters and polyamides, organic polymers such as cellophane, paper and cardboard, textiles and non-woven materials.

In a preferred embodiment of the invention, the surface of the second film is coated with an adhesive to further increase the bond strength between the first film and the second film. Due to the inventive heating of the first film, the amount of adhesive necessary for bonding the films can be significantly reduced. In a preferred embodiment, the adhesive is applied to the surface of the second film at a coating weight of less than 2 g/m$^2$, preferably less than 1 g/m$^2$, especially 0.01 to 0.7 g/m$^2$. It was surprisingly found that although reduced amounts of adhesive were used, no delamination of the product was observed. In contrast, the bonded films showed an excellent bond strength making them suitable for a wide variety of applications. Any suitable adhesive may be used in the inventive process. However, in a preferred embodiment, the adhesive employed in the inventive process is selected from thermoplastic adhesives or cross-linkable adhesives in solvent-containing, aqueous or solvent-free form. Further preferred is an embodiment wherein the adhesive is based on thermoplastic polymers such as polyurethanes, ethylene-vinyl-acetate, solvent-containing adhesives such as acrylate adhesives, one- or two-component polyurethane adhesives, silane-crosslinking adhesives, reactive adhesives such as one-component polyurethane adhesives, solvent-free one- or two-component polyurethane adhesives, silane systems or radiation cross-linkable systems.

Another object the present invention is a device for carrying out the process according to the invention. The device according to the invention includes
a) a feeding device for supplying a first film having a thermoplastic surface;
b) a feeding device for supplying a second film
c) an assembly of heatable rollers for heating the thermoplastic surface of the first film to transform the thermoplastic surface into a softened state;
d) means for contacting the first film and the second film; and
e) an output device for dispersing the joint first and second film.

The set-up of the inventive device allows for an individual adjustment of the speed with which the film is transported. In a preferred embodiment, the rollers are therefore actively driven.

It was surprisingly found that deformation of the heated film can be avoided by carefully controlling the energy input during the heating process. In a preferred embodiment, the heatable rollers included in the inventive device are therefore individually controllable.

In a preferred embodiment of the inventive device, the device comprises a series of rollers which are arranged on both sides of the film wherein each roller is individually adjustable in order to bring the surface of the roller into contact with the film. Preferably, the set of rollers is operated in way that neighboring rollers have opposite direction of rotation. At least the rollers facing the thermoplastic surface of the first film are heatable rollers to transfer the thermoplastic surface of the film into a softened state. It was found that by individually adjusting the rollers, the contact area between the rollers and the film may be adapted according to need, allowing a precise adjustment of the energy input of the thermoplastic surface and eliminating the need for additional cooling. The rollers are preferably adjustable in a linear and/or non-linear way.

In a preferred embodiment, the inventive device further includes means for coating the surface of the second film with an adhesive.

The inventive device includes means for contacting the first film having a thermoplastic surface, the surface being in a softened state, and the second film. In a preferred embodiment, the means for contacting the first and second film includes at least one lamination unit for pressing the second film against the softened surface of the first film.

The lamination unit is preferably arranged behind the heating device along the process direction. In a particular preferred embodiment, the lamination unit is arranged in close proximity to the at least one of the heatable rollers. In a preferred embodiment contacting of the first and the second film is realized by leading the films between at least one of the heatable rollers and the lamination unit. The lamination unit is preferably provided in form of a lamination roller which may be heated. It was surprisingly found that lamination could be improved by employing a lamination unit having two rollers, one being a heatable roller and the other being a non-heatable roller. In an especially preferred embodiment, the lamination unit therefore comprises at least two rollers, one of which is preferably a heatable roller. The preferred design of the lamination unit allows highly effective activation of the thermoplastic surface of the first film, by heating of the site of the film to be bonded by direct roller contact.

Any of the components of the inventive device may be operated in a way that ensures fast and efficient production. In a preferred embodiment, the first film is transported with 0.5 to 1.5 times, preferably 0.9 to 1.1 times the speed of the second film. Further, the speed of the heatable rollers may be adapted relative to the speed of the first and/or second film according to need.

The inventive process and the inventive device are especially designed for laminating flexible films. A further object of the present invention is therefore a composite body obtained by the process according to the invention or the device according to the invention. In case the inventive process is carried out using an adhesive, the inventive composite body is especially distinguished by the thin layer of adhesive between the films. The adhesive layer preferably has a thickness of less 5 μm, preferably less than 2 μm and especially less than 1 μm.

The present invention is described in more detail by reference to the following figures which are by no means to be understood as limiting the scope or spirit of the invention.

Figure 2:
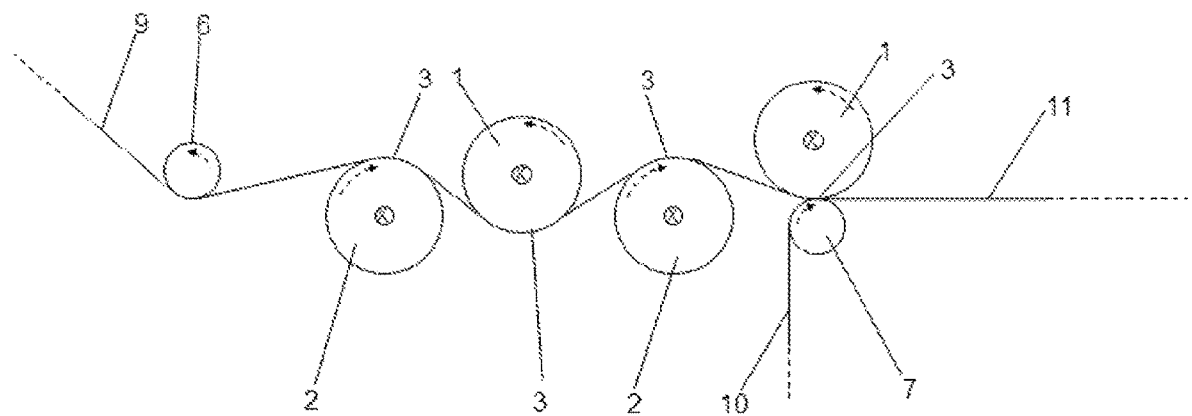
FIG. 2 shows the embodiment of FIG. 1 in a working state.

FIGS. 1 and 2 show an embodiment of the present invention wherein a set of rollers is adjustable in a linear way is arranged in either side of the first film. FIG. 1 shows an embodiment wherein the inventive device is in an idle state and FIG. 2 shows the inventive device in a working state. A film (9) having a thermoplastic surface is led through a series of rollers (1,2) in which at least one of the rollers is a heatable roller to transfer the thermoplastic surface of the film into a softened state. Contact of the rollers (1,2) to the film is established by adjusting the rollers along an axis (5). This allows the contact area between the film and the rollers to be adapted according to need. After being led through the series of rollers, the first film (9) is brought into contact with the second film (10) in a way that the surface of the second film (10) is contacted with the thermoplastic surface of the first (9) which is in a softened state. Contacting is performed by way of lamination unit (7) to obtain the laminated product (11).

Figure 3:
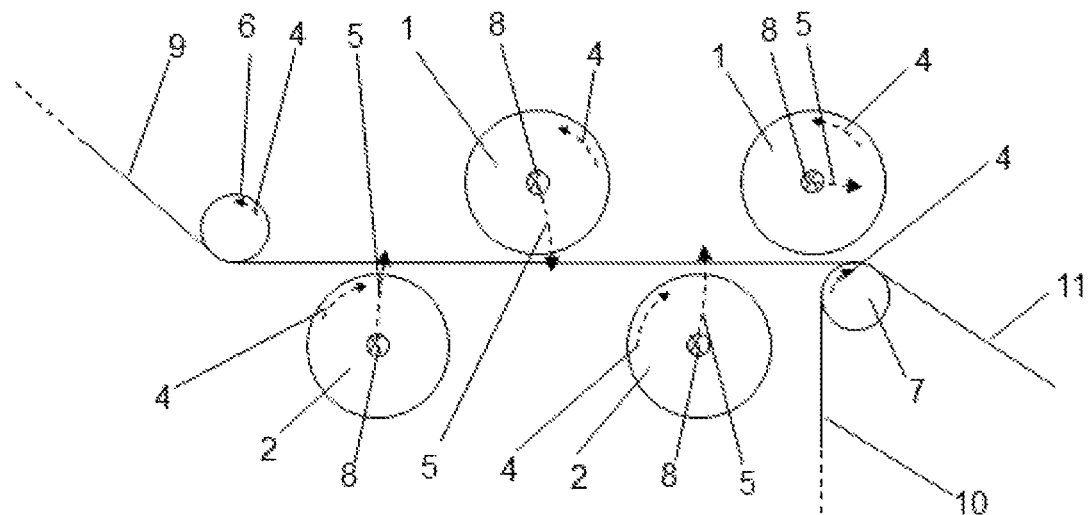
FIG. 3 shows an embodiment of the present invention wherein a set of rollers is adjustable in a non-linear way and is arranged in either side of the first film. The embodiment of FIG. 3 is in an idle state.
Figure 4:
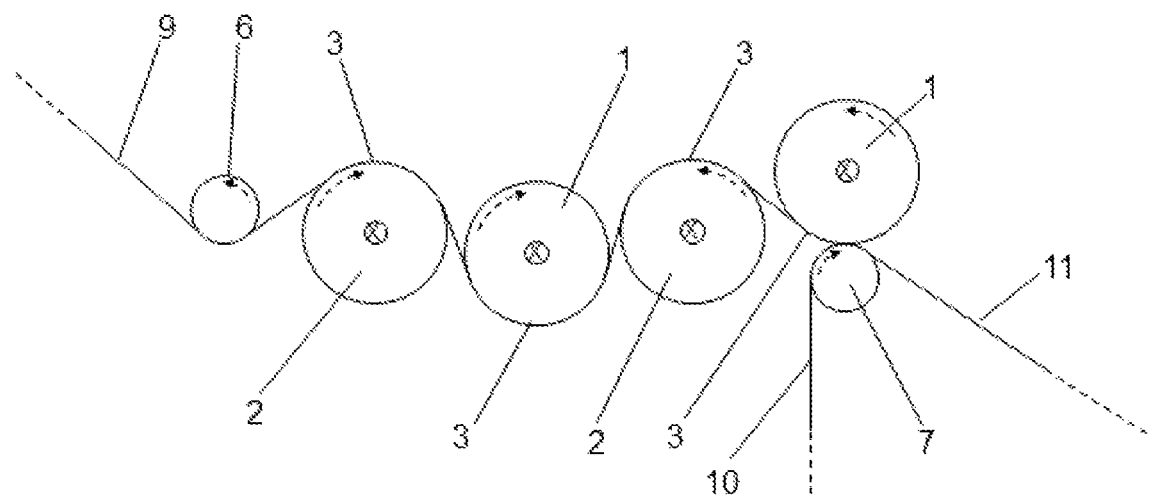
FIG. 4 shows an embodiment of FIG. 3 in a working state.

FIGS. 3 and 4 show an embodiment of the present invention wherein a set of rollers is adjustable in a non-linear way, FIG. 3 showing the inventive device in an idle state while FIG. 4 shows the inventive device in a working state. A film (9) having a thermoplastic surface is led through a series of rollers (1,2) in which at least one of the rollers is a heatable roller to transfer the thermoplastic surface of the film into a softened state. Contact of the rollers (1,2) to the film is established by adjusting the rollers along an axis (5). This allows the contact area between the film and the rollers to be maximized for achieving a high degree of efficiency.

After being led through the series of rollers, the first film (9) is brought into contact with the second film (10) in a way that the surface of the second film (10) is contacted with the thermoplastic surface of the first (9) which is in a softened state. Contacting is performed by way of lamination unit (7) to obtain the laminated product (11).

LIST OF REFERENCE SIGNS 1 upper roller
2 lower roller
3 contact area
4 direction of rotation
5 movement of axis
6 front pulley
7 lamination unit
8 axis
9 first film
10 second film
11 laminate

The invention claimed is:

1. A process for laminating flexible films, comprising:
providing a laminating device including an input end, an output end, a feed direction from the input end to the output end, a feed axis from the input end to the output end and a first assembly of 2 to 10 heated rollers between the input end and the output end;
providing a first film having a thermoplastic surface;
moving the first film through the laminating device along the feed axis and in the feed direction;
heating the thermoplastic surface of the first film by contact of the thermoplastic surface with the first assembly of 2 to 10 heated rollers;
providing a second film having a bonding surface;
providing adhesive;
coating the second film bonding surface with the adhesive at a coating weight of 2 g/m$^2$ or less; and
bringing the second film adhesive coated bonding surface into contact with the softened first film thermoplastic surface under pressure to form a laminated flexible film;
wherein:
the first film is introduced into the feed axis at the input end,
the laminated flexible film exits the laminating device at the output end;
the feed axis is substantially linear from the input end to the output end when the laminating device is in an idle state;
each of the heated rollers of the first assembly of heated rollers is on a first side of the feed axis adjacent the thermoplastic surface of the first film;
each of the heated rollers of the first assembly of heated rollers is independently controllable along a roller axis for position with respect to the first film, wherein each roller axis is non-linear and/or each of the heated rollers of the first assembly is controllable for temperature independently of the other rollers in the first assembly; and
the step of heating the thermoplastic surface comprises:
individually controlling each heated roller position with respect to the first film, or individually controlling each heated roller temperature or individually controlling both each heated roller position and temperature; and
converting the thermoplastic surface into a softened state that can be plastically deformed while the first film remains dimensionally stable without losing its shape.

2. The process according to claim 1, wherein the bonding surface of the second film is coated with 2 g/m$^2$ or less of an adhesive before the step of bringing the second film bonding surface and the coated adhesive into contact with the softened first film thermoplastic surface under pressure.

3. The process according to claim 1, wherein the first assembly has 2 to 5 heated rollers.

4. The process according to claim 1, wherein each of the heated rollers of the first assembly is independently controllable for position relative to the other rollers in the first assembly.

5. The process according to claim 1, wherein the first film comprises a material selected from polyolefin, polyvinyl chloride, ethylene copolymer, polyester, polylactide, polyamide and ionomer.

6. The process according to claim 1, wherein the second film comprises a material selected from metal, metal alloy, thermosetting plastic, thermoplastic plastic, organic polymer, textiles and non-woven material.

7. The process according to claim 1, wherein the first film has an outside surface opposing the thermoplastic surface and the second film has an outside surface opposing the bonding surface;
the laminating device further includes a lamination unit adjacent the output end, the lamination unit comprising a first roll contacting the outside surface of the first film and a second roll contacting the outside surface of the second film;
the step of bringing the second film adhesive coated bonding surface into contact with the softened first film thermoplastic surface under pressure is effected by the lamination unit; and
the first assembly of 2 to 10 heated rollers is disposed between the input end and the lamination unit.

8. The process according to claim 1 being free of cooling of the first film.

9. The process according to claim 1, wherein the first film has an outside surface opposing the thermoplastic surface and the second film has an outside surface opposing the bonding surface;
the laminating device further includes a lamination unit adjacent the output end, the lamination unit comprising a first roll contacting the outside surface of the first film and a second roll contacting the outside surface of the second film wherein at least one of the lamination unit rolls is heated;
the step of bringing the second film adhesive coated bonding surface into contact with the softened first film thermoplastic surface under pressure is effected by the lamination unit.

10. The process according to claim 1, wherein each of the heated rollers of the first assembly is independently controllable for position relative to the other rollers in the assembly and comprising a step of controlling energy input to the thermoplastic surface of the first film by adjusting the distance between the heatable rollers and the first film.

* * * * *